US012450562B2

(12) United States Patent
Uchimura et al.

(10) Patent No.: US 12,450,562 B2
(45) Date of Patent: Oct. 21, 2025

(54) INFORMATION PROCESSING APPARATUS, ARTICLE MANAGEMENT SYSTEM, AND ARTICLE MANAGEMENT METHOD

(71) Applicant: NEC Corporation, Tokyo (JP)

(72) Inventors: Jun Uchimura, Tokyo (JP); Yasuyo Kazo, Tokyo (JP)

(73) Assignee: NEC CORPORATION, Tokyo (JP)

( * ) Notice: Subject to any disclaimer, the term of this patent is extended or adjusted under 35 U.S.C. 154(b) by 260 days.

(21) Appl. No.: 18/275,938

(22) PCT Filed: Jan. 18, 2022

(86) PCT No.: PCT/JP2022/001614
§ 371 (c)(1),
(2) Date: Aug. 4, 2023

(87) PCT Pub. No.: WO2022/176480
PCT Pub. Date: Aug. 25, 2022

(65) Prior Publication Data
US 2024/0119410 A1 Apr. 11, 2024

(30) Foreign Application Priority Data
Feb. 19, 2021 (JP) .................................. 2021-024952

(51) Int. Cl.
*G06Q 10/087* (2023.01)
(52) U.S. Cl.
CPC .................................. *G06Q 10/087* (2013.01)
(58) Field of Classification Search
CPC ...... G06Q 10/087; G06Q 10/08; G06Q 30/06; B65G 1/137
See application file for complete search history.

(56) References Cited

U.S. PATENT DOCUMENTS

2011/0270438 A1* 11/2011 Shimamura .......... G06Q 10/087
700/214
2016/0343006 A1* 11/2016 Itoh .......................... G07G 1/14
(Continued)

FOREIGN PATENT DOCUMENTS

| JP | 2003-157472 A | 5/2003 |
| JP | 2019-121013 A | 7/2019 |

(Continued)

OTHER PUBLICATIONS

International Search Report for PCT Application No. PCT/JP2022/001614, mailed on Apr. 26, 2022.

*Primary Examiner* — Michael Jared Walker
(74) *Attorney, Agent, or Firm* — Sughrue Mion, PLLC

(57) ABSTRACT

An information processing apparatus includes: an information acquisition unit that acquires recipient identification information that identifies a recipient of an article stored in a warehouse and attribute information indicating an attribute that needs to be satisfied during storage of the article; an association unit that stores, in a storage region, storage space identification information that identifies a target storage space selected based on the attribute information, and article determination information that determines the article in association with each other; an article determination information transmission unit that transmits the article determination information to a terminal determined by using the recipient identification information, in response to the article being disposed in the target storage space; and an article ejection unit that ejects, from a predetermined outlet, the article stored in the target storage space in response to an input of the article determination information.

20 Claims, 8 Drawing Sheets

(56) References Cited

U.S. PATENT DOCUMENTS

| | | | |
|---|---|---|---|
| 2017/0301004 A1* | 10/2017 | Chirnomas | G06Q 20/12 |
| 2021/0061564 A1* | 3/2021 | Ibe | G07F 11/26 |
| 2021/0133666 A1* | 5/2021 | Eckman | G06T 7/62 |
| 2022/0234831 A1* | 7/2022 | Szyszkowski | B65G 1/1375 |
| 2022/0270032 A1* | 8/2022 | Iwamoto | G06V 20/52 |

FOREIGN PATENT DOCUMENTS

| | | |
|---|---|---|
| JP | 2019-175358 A | 10/2019 |
| WO | 2021/010298 A1 | 1/2021 |

\* cited by examiner

INFORMATION PROCESSING APPARATUS, ARTICLE MANAGEMENT SYSTEM, AND ARTICLE MANAGEMENT METHOD

This application is a National Stage Entry of PCT/JP2022/001614 filed on Jan. 18, 2022, which claims priority from JP Patent Application 2021-024952 filed on Feb. 19, 2021, the contents of all of which are incorporated herein by reference, in their entirety.

TECHNICAL FIELD

The present invention relates to an information processing apparatus, an article management system, and an article management method.

BACKGROUND ART

At a time when an infectious disease is spreading, a risk of infection increases at a place where people are more likely to gather. For example, people are more likely to gather at a store that handles products such as food and daily necessaries, and it is important to reduce opportunities to come into contact with other people as much as possible when a product is purchased.

One example of a technique for reducing opportunities to come into contact with other people at a time of purchase or reception of a product is disclosed in Patent Documents 1 and 2 described below. Patent Document 1 discloses a non-face-to-face product hand-over system using a locker apparatus including a plurality of storage boxes. Specifically, a system is disclosed for notifying, when the system detects that a store staff member picks a product ordered from a customer and stores the product in the storage box of the locker apparatus, a notification including a key for unlocking the storage box to a terminal of the customer, and unlocking the storage box in response to an input of the key and completion of settlement. Further, Patent Document 2 discloses a system for handing over a product sold or rented online to a user in an unattended manner by using a multi-box apparatus including a plurality of storage portions. Specifically, a system is disclosed for transmitting, when a product is stored in the storage portion of the multi-box, a notification indicating that the product is stored to a user terminal, and then allowing the product to be taken out by releasing a lock of the storage portion in response to an input of information instructing the taking-out of the product.

RELATED DOCUMENT

Patent Document

Patent Document 1: Japanese Patent Application Publication No. 2019-175358
Patent Document 2: Japanese Patent Application Publication No. 2003-157472

SUMMARY OF INVENTION

Technical Problem

Various articles (products) are available in a store. Then, each of the articles has an appropriate storage environment. Thus, in the systems as described above, when a certain article is stored in a storage environment not suitable for the article, a problem that the article is adversely affected (for example, quality deteriorates) may occur.

The present invention has been made in view of the above-described problem. One of objects of the present invention is to provide a technique for appropriately storing an article in a system for reducing opportunities of contact between a person and a person during a transaction of an article.

Solution to Problem

An information processing apparatus according to the present disclosure includes:
  an information acquisition unit that acquires recipient identification information that identifies a recipient of an article stored in a warehouse including a plurality of storage spaces, and attribute information indicating an attribute that needs to be satisfied during storage of the article;
  an association unit that selects, as a target storage space, a storage space having the attribute indicated by the attribute information from among the plurality of storage spaces, and stores, in a storage region, storage space identification information that identifies the target storage space and article determination information that determines the article in association with each other;
  an article determination information transmission unit that determines a terminal used by the recipient by using the recipient identification information, in response to the article being disposed in the target storage space, and transmits the article determination information to the terminal; and
  an article ejection unit that ejects, from a predetermined outlet, the article stored in the target storage space identified by the storage space identification information being associated with the article determination information, in response to an input of the article determination information.

An article management system according to the present disclosure includes:
  a warehouse including a plurality of storage spaces;
  an information acquisition unit that acquires recipient identification information that identifies a recipient of an article stored in the warehouse, and attribute information indicating an attribute that needs to be satisfied during storage of the article;
  an association unit that selects, as a target storage space, a storage space having the attribute indicated by the attribute information from among the plurality of storage spaces, and stores, in a storage region, storage space identification information that identifies the target storage space and article determination information that determines the article in association with each other;
  an article determination information transmission unit that determines a terminal used by the recipient by using the recipient identification information, in response to the article being disposed in the target storage space, and transmits the article determination information to the terminal; and
  an article ejection unit that ejects, from a predetermined outlet, the article stored in the target storage space identified by the storage space identification information being associated with the article determination information, in response to an input of the article determination information.

An article management method according to the present disclosure includes, by a computer:

acquiring recipient identification information that identifies a recipient of an article stored in a warehouse including a plurality of storage spaces, and attribute information indicating an attribute that needs to be satisfied during storage of the article;

selecting, as a target storage space, a storage space having the attribute indicated by the attribute information from among the plurality of storage spaces;

storing, in a storage region, storage space identification information that identifies the target storage space and article determination information that determines the article in association with each other;

determining a terminal used by the recipient by using the recipient identification information, in response to the article being disposed in the target storage space;

transmitting the article determination information to the terminal; and ejecting, from a predetermined outlet, the article stored in the target storage space identified by the storage space identification information being associated with the article determination information, in response to an input of the article determination information.

The present disclosure includes a program for causing a computer to function as:

an information acquisition unit that acquires recipient identification information that identifies a recipient of an article stored in a warehouse including a plurality of storage spaces, and attribute information indicating an attribute that needs to be satisfied during storage of the article;

an association unit that selects, as a target storage space, a storage space having the attribute indicated by the attribute information from among the plurality of storage spaces, and stores, in a storage region, storage space identification information that identifies the target storage space and article determination information that determines the article in association with each other;

an article determination information transmission unit that determines a terminal used by the recipient by using the recipient identification information, in response to the article being disposed in the target storage space, and transmits the article determination information to the terminal; and an article ejection unit that ejects, from a predetermined outlet, the article stored in the target storage space identified by the storage space identification information being associated with the article determination information, in response to an input of the article determination information.

Advantageous Effects of Invention

The present invention allows, in a system for reducing opportunities of contact between a person and a person during a transaction of an article, an article to be appropriately stored.

DESCRIPTION OF EMBODIMENTS

Figure 1:
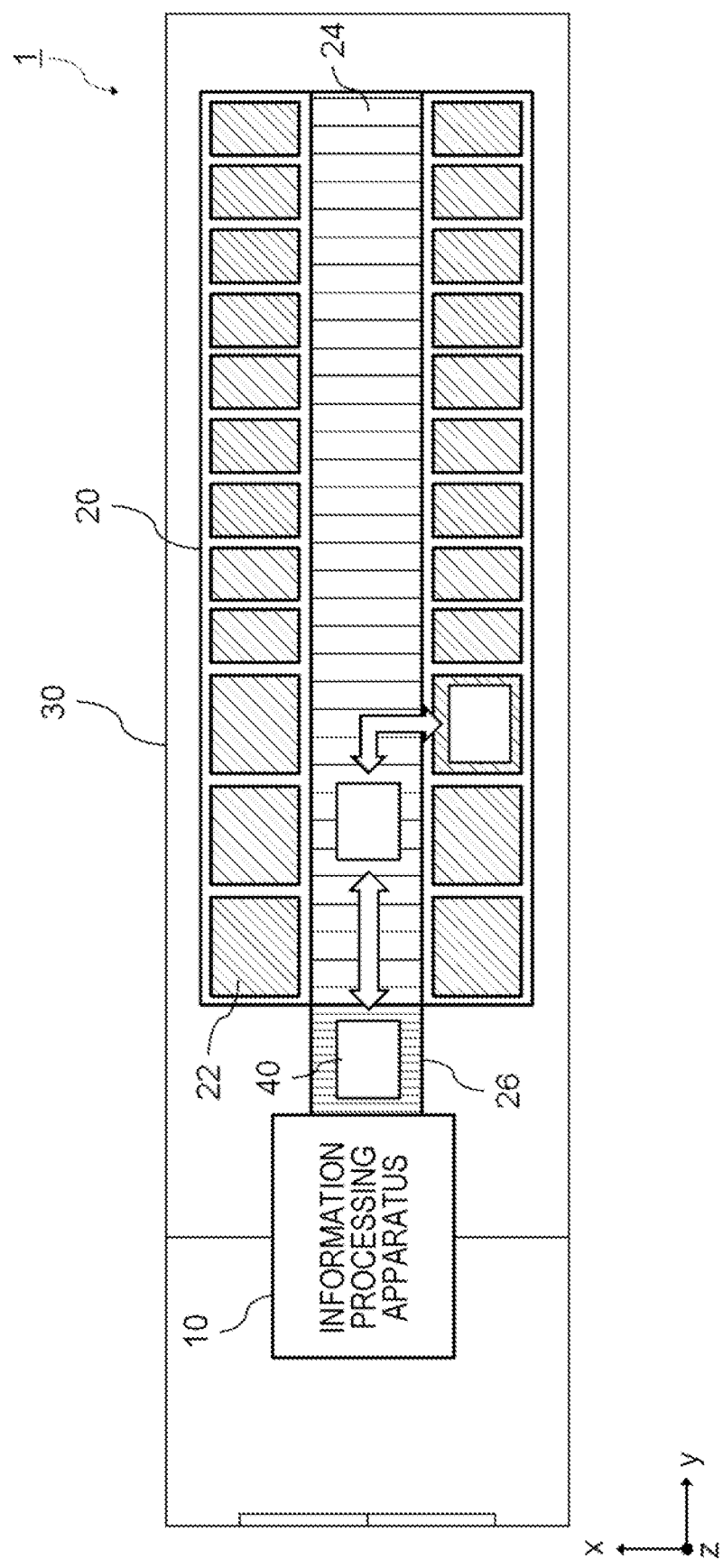
FIG. 1 is a diagram schematically illustrating one example of a configuration of an article management system.

Hereinafter, example embodiments of the present invention will be described by using drawings. Note that, in all of the drawings, a similar component has a similar reference sign, and description thereof will not be repeated as appropriate. Further, in each block diagram, each block represents a configuration of a functional unit instead of a configuration of a hardware unit unless otherwise described. Further, the direction of an arrow in the drawings is aimed at facilitating understanding of the flow of information, and does not limit a communication direction (one-way communication/two-way communication) unless otherwise described.

[System Configuration Example]

Figure 2:
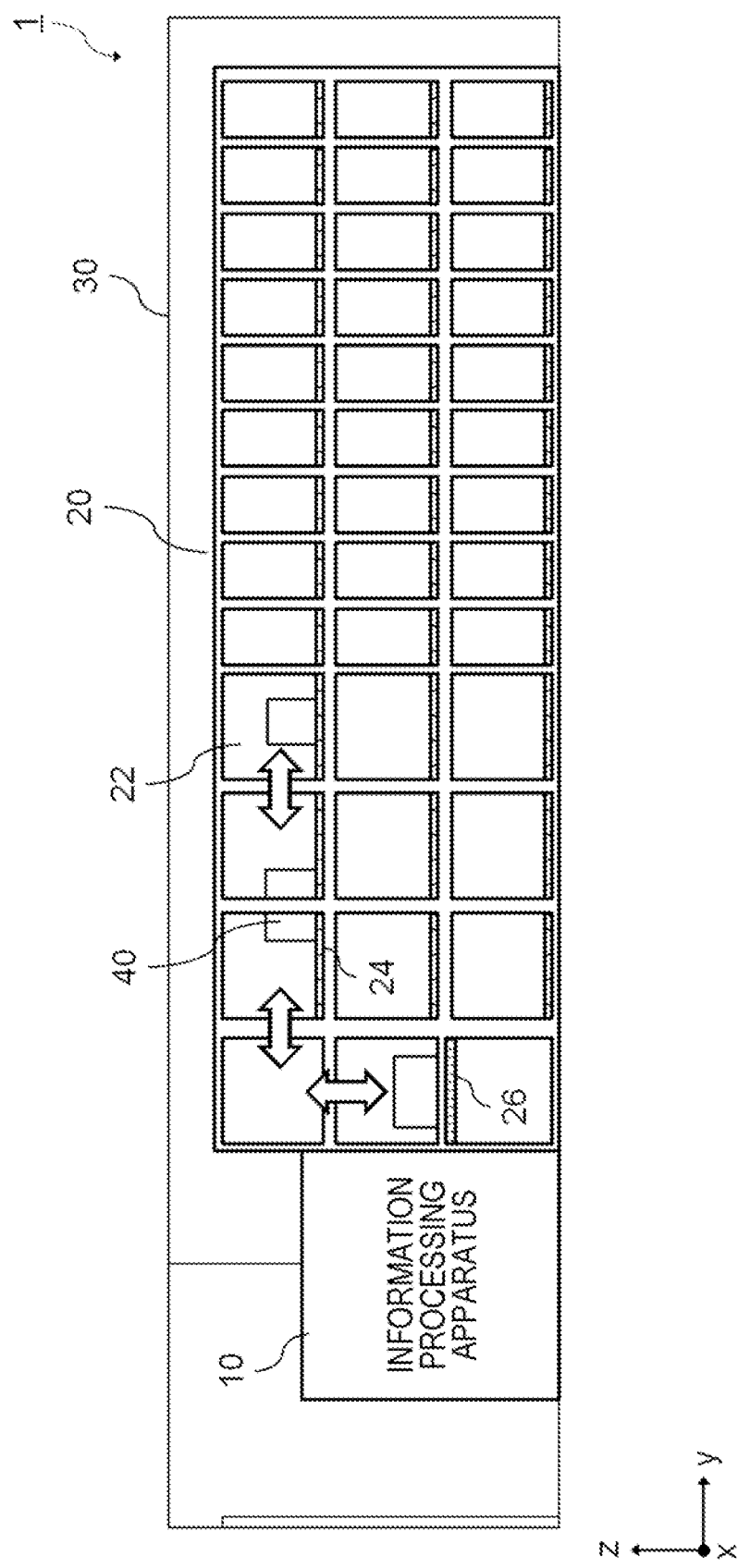
FIG. 2 is a diagram schematically illustrating one example of a configuration of the article management system.

FIGS. 1 and 2 are diagrams schematically illustrating one example of a configuration of an article management system 1. FIG. 1 illustrates a plan view of the article management system 1. FIG. 2 illustrates a cross-sectional view of the article management system 1.

As illustrated in FIGS. 1 and 2, the article management system 1 is configured to include an information processing apparatus 10 and a warehouse 20. In the examples in FIGS. 1 and 2, the information processing apparatus 10 and the warehouse 20 are set in a facility 30.

The warehouse 20 includes a plurality of storage spaces 22 for storing an article. Shapes and sizes of the plurality of storage spaces 22 may be the same for all of the storage spaces 22, or at least some may be different. Further, an apparatus (not illustrated) for adjusting an internal temperature may be provided in at least some of the storage spaces 22. Further, the warehouse 20 includes a conveyance path 24 and an elevator 26 for moving an article. The information processing apparatus 10 stores an article 40 in the storage space 22 being a target and takes out the article 40 stored in the storage space 22 being a target by controlling a movement of the conveyance path 24 and the elevator 26. A functional configuration example of the information processing apparatus 10 will be described below.

[Functional Configuration Example]

Figure 3:
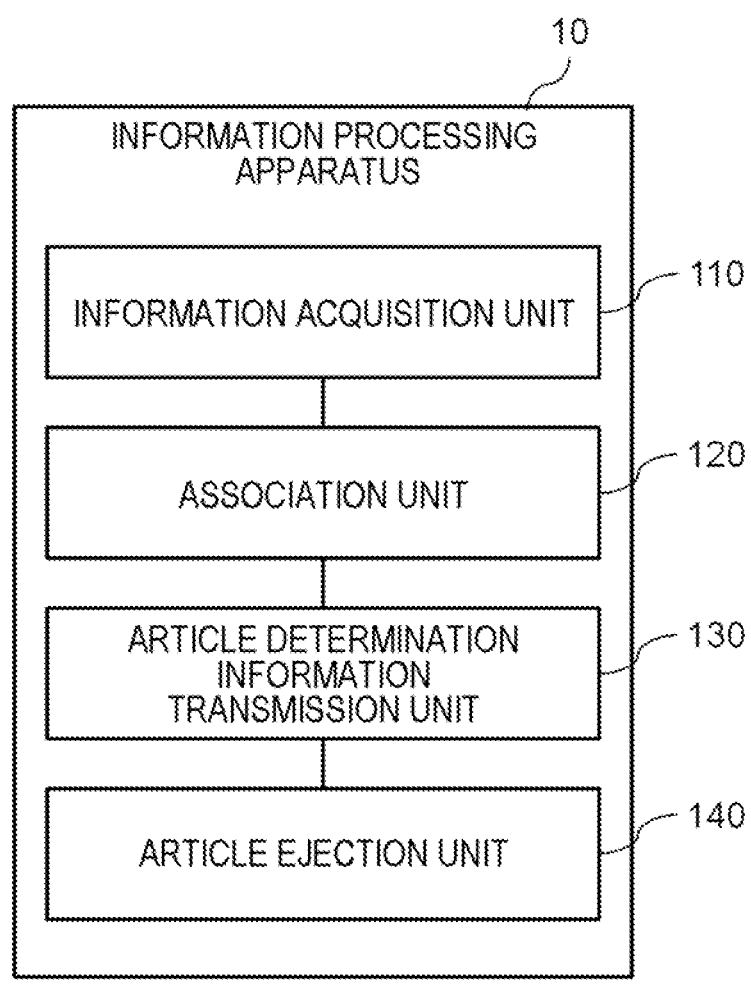
FIG. 3 is a diagram illustrating a functional configuration of an information processing apparatus.

FIG. 3 is a diagram illustrating a functional configuration of the information processing apparatus 10. As illustrated in FIG. 1, the information processing apparatus 10 includes an information acquisition unit 110, an association unit 120, an article determination information transmission unit 130, and an article ejection unit 140.

The information acquisition unit 110 acquires information (hereinafter, also described as "recipient identification information") that identifies a recipient of an article stored in the storage space 22 of the warehouse 20, and information (hereinafter, also described as "attribute information") indicating an attribute that needs to be satisfied during storage of the article.

The association unit 120 selects, from among the plurality of storage spaces 22, the storage space 22 (hereinafter, also referred to as a "target storage space") having the attribute indicated by the attribute information being acquired by the information acquisition unit 110. Further, the association unit 120 stores, in a predetermined storage region, information (hereinafter, also described as "storage space identification information") that identifies a target storage space and information (hereinafter, also described as "article determination information") for determining an article received by the information processing apparatus 10 in association with each other.

The article determination information transmission unit 130 transmits, in response to storage of the article received by the information processing apparatus 10 in the target storage space, information (hereinafter, also described as "article determination information") for determining the article to a terminal of a recipient of the article. The article determination information transmission unit 130 can determine a terminal being a transmission destination of the article determination information by using the recipient identification information acquired by the information acquisition unit 110. As one example, a table that stores the recipient identification information in association with a destination address of the terminal is prepared in advance. In this case, the article determination information transmission unit 130 can determine the terminal being the transmission destination of the article determination information by acquiring the destination address associated with the recipient identification information acquired by the information acquisition unit 110 by referring to the table.

When the article ejection unit 140 receives an input of the article determination information, the article ejection unit 140 refers to the information stored in the storage region by the association unit 120, and reads storage space identification information associated with the input article determination information. Then, the article ejection unit 140 ejects, from an outlet that is not illustrated, the article stored in the storage space identified by the read storage space identification information. The outlet may be provided in the information processing apparatus 10, or may be provided outside the information processing apparatus 10. The article ejection unit 140 can take out an article stored in a desired storage space from the storage space, and convey the article to a predetermined outlet by controlling an operation of the conveyance path 24 and the elevator 26 directly or via a non-illustrated control apparatus for the warehouse 20.

[Hardware Configuration Example]

Each functional component unit of the information processing apparatus may be achieved by hardware (for example, a hard-wired electronic circuit and the like) that achieves each functional component unit, and may be achieved by a combination of hardware and software (for example, a combination of an electronic circuit and a program that controls the electronic circuit and the like). Hereinafter, a case where each functional component unit of the information processing apparatus 10 is achieved by the combination of hardware and software will be further described.

Figure 4:
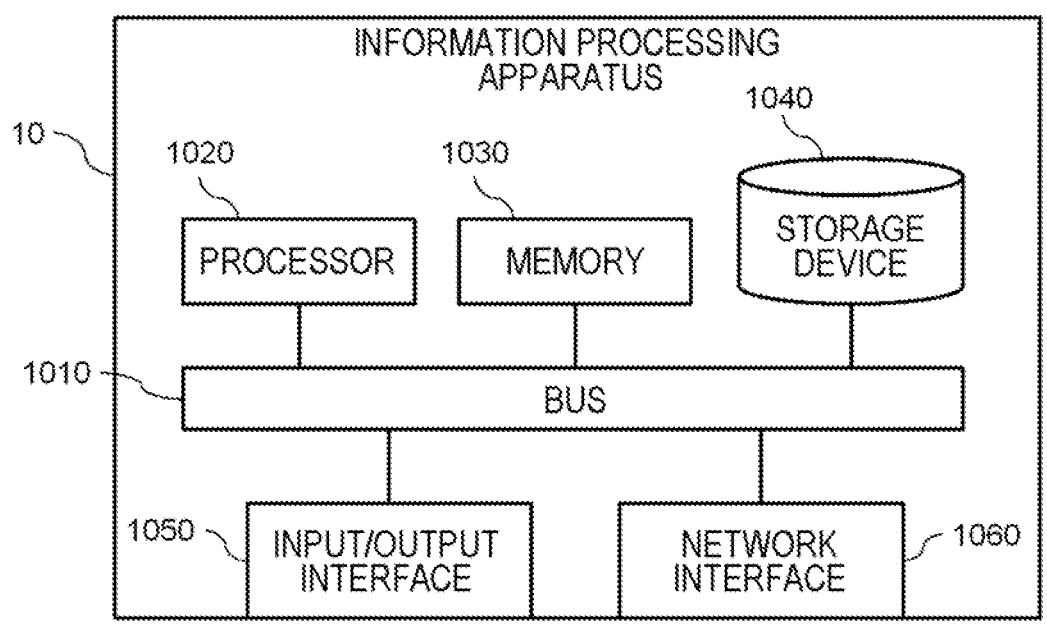
FIG. 4 is a block diagram illustrating a hardware configuration of the information processing apparatus.

FIG. 4 is a block diagram illustrating a hardware configuration of the information processing apparatus 10. The information processing apparatus 10 includes a bus 1010, a processor 1020, a memory 1030, a storage device 1040, an input/output interface 1050, and a network interface 1060.

The bus 1010 is a data transmission path for allowing the processor 1020, the memory 1030, the storage device 1040, the input/output interface 1050, and the network interface 1060 to transmit and receive data to and from one another. However, a method for connecting the processor 1020 and the like to one another is not limited to bus connection.

The processor 1020 is a processor achieved by a central processing unit (CPU), a graphics processing unit (GPU), and the like.

The memory 1030 is a main storage device achieved by a random access memory (RAM) and the like.

The storage device 1040 is an auxiliary storage device achieved by a hard disk drive (HDD), a solid state drive (SSD), a memory card, a read only memory (ROM), or the like. The storage device 1040 stores a program module that achieves each function (such as the information acquisition unit 110, the association unit 120, the article determination information transmission unit 130, and the article ejection unit 140) of the information processing apparatus 10. The processor 1020 reads each program module onto the memory 1030 and executes each program module, and each function associated with each program module is achieved.

The input/output interface 1050 is an interface for connecting the information processing apparatus 10 and various types of input/output equipment. For example, an input apparatus such as a keyboard and a touch panel, an output apparatus such as a display and a speaker, and the like may be connected to the input/output interface 1050. Further, a proximity wireless communication module and the like may be connected to the input/output interface 1050.

The network interface 1060 is an interface for connecting the information processing apparatus 10 to another apparatus on a network. The network is, for example, a local area network (LAN) and a wide area network (WAN). A method of the network interface 1060 connecting to the network may be wireless connection or wired connection.

[Flow of Processing]

Figure 5:
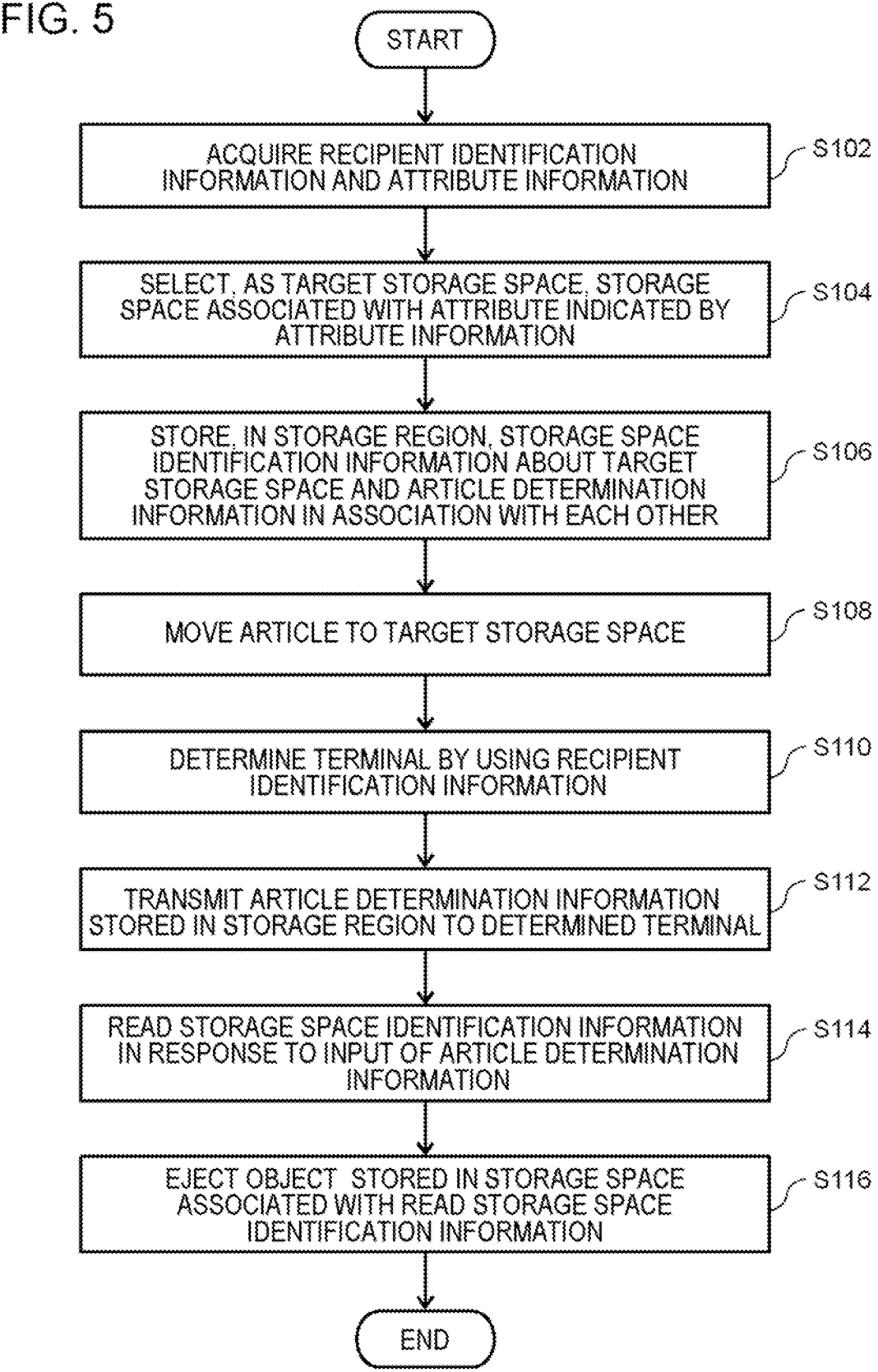
FIG. 5 is a flowchart illustrating processing performed by the information processing apparatus.

FIG. 5 is a flowchart illustrating processing performed by the information processing apparatus 10.

The information acquisition unit 110 acquires recipient identification information and attribute information about an article stored in the warehouse 20 (S102). The association unit 120 selects, from among the plurality of storage spaces 22, a target storage space associated with an attribute indicated by the attribute information being acquired by the information acquisition unit 110 in the processing in S102 (S104). Then, the association unit 120 stores, in a storage region, article determination information for determining the article stored in the warehouse 20 and storage space identification information for identifying the target storage space being selected in the processing in S104 in association with each other (S106).

Further, when the target storage space is selected in the processing in S104, the information processing apparatus 10 moves the article to the target storage space by controlling an operation of the conveyance path 24 and the elevator 26 (S108). When the article is disposed in the target storage space, the article determination information transmission unit 130 determines a terminal being a transmission destination of the article determination information by using the recipient identification information being acquired in the processing in S102 (S110). Then, the article determination information transmission unit 130 transmits, to the terminal determined in S110, the article determination information stored in the storage region in association with the storage space identification information about the target storage space described above in the processing in S106 (S112).

Herein, the article determination information transmitted to the terminal of the recipient is needed when the article stored in the target storage space described above is taken out.

The recipient of the article recognizes, from the article determination information transmitted to the terminal, that it has become possible to receive the article in the facility 30. Then, the recipient goes to the facility 30, and inputs, to the information processing apparatus 10, the article determination information transmitted to the terminal. For example, the recipient may input the article determination information by using an input apparatus (such as a keyboard and a touch panel) provided to the information processing apparatus 10, or may input the article determination information by using a wireless communication function of the terminal.

In response to the input of the article determination information, the article ejection unit 140 reads the storage space identification information stored in association with the article determination information in the processing in S108 (S114). Then, the article ejection unit 140 ejects, from a predetermined outlet, the article stored in the storage space identified by the read storage space identification information (S116). Subsequently, the recipient receives the article ejected from the outlet.

Hereinafter, a flow of the processing described in the flowchart described above will be described in more detail with several specific use cases.

<First Use Case: Product Sale>

Herein, a use case in which a product is sold by using the article management system 1 will be described. In this use case, a recipient is a general consumer who purchases a product of a store.

Figure 6:
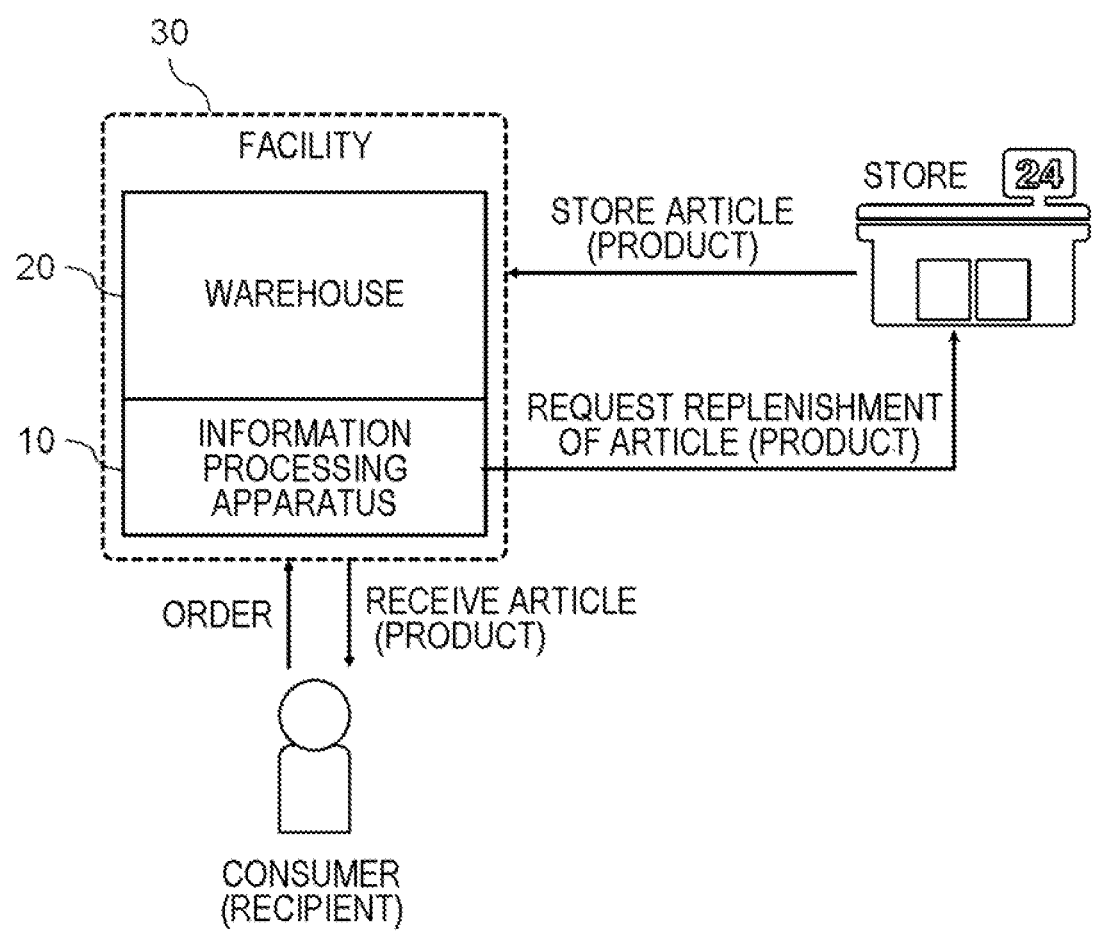
FIG. 6 is a diagram illustrating a system configuration in a first use case.

FIG. 6 is a diagram illustrating a system configuration in the first use case. As illustrated in FIG. 6, a consumer orders a product by using a terminal possessed by himself/herself. For example, the consumer may order a product by reading a product code displayed on a shelf label provided on a shelf fixture in the store via an application activated on the terminal possessed by himself/herself. Further, the consumer may call the store, and tell a salesclerk a product to be ordered. Further, the consumer may display a Web site for an online order on the terminal possessed by himself/herself, and order a product via the Web site. When an order procedure is completed on the Web site, order information is transmitted to a store terminal (not illustrated) provided in the store being a target. Note that, in a Web site for ordering online, the consumer can also collectively order products from a plurality of different stores having a certain facility 30 in the delivery area.

The article management system 1 may further have a function of providing a Web site for ordering online. For example, the information processing apparatus 10 or another apparatus that is not illustrated may be configured to provide data about a Web site for ordering online in response to a request from a terminal of a consumer. In this case, the information processing apparatus 10 may further have a function of providing a user with information based on whether a product desired to be purchased by the consumer can be received. For example, the consumer transmits information about desired products to the information processing apparatus 10 via a Web site for ordering online while the consumer is on way home by using public transportation or at home. First, the information processing apparatus 10 ascertains, with respect to a facility A being registered in advance as the facility 30 normally used by the consumer, whether all of the desired products can be received therein. For example, the information processing apparatus 10 acquires information about stock of a product, information about whether product delivery is available, and the like from the systems of one or more stores having the facility A in the product delivery area. The information processing apparatus 10 decides whether the consumer can receive all of the desired products in the facility A, based on the information acquired in such a manner, and transmits a result thereof to a terminal of the consumer. The consumer studies the information displayed on his/her terminal about whether the desired products can be received, and decides which facility 30 to receive the product in. As one example, it is assumed that information displayed on the terminal indicates that all of the desired products can be received in the facility A. In this case, the consumer can perform setting in such a way as to receive the products in the facility A, and complete an order procedure. As another example, it is assumed that information displayed on the terminal indicates that some of the desired products cannot be received in the facility A as being out of stock. In this case, the consumer specifies a facility B that can be used by the consumer other than the facility A by using his/her terminal, and further acquires information about whether all of the desired products can be received in the facility B. Herein, when information indicating that all of the desired products can be received in the facility B can be acquired, the consumer can perform setting in such a way as to receive the products in the facility B instead of the facility A being normally used, and complete an order procedure.

Further, when some of the desired products cannot be received in the facility A due to being out of stock, the consumer may transmit, to the information processing apparatus 10, a request to search for the facility 30 where the products being out of stock can be received. In this case, the information processing apparatus 10 makes an inquiry about a stock status of the products being out of stock and whether delivery is available from the systems of one or more stores having the facility 30 present in a field of activities of the consumer (for example, the facility 30 present within a predetermined range from the house, within a predetermined range from the workplace, within a predetermined range from the commuting route or a transfer station, and the like) in the delivery area. The information processing apparatus 10 creates a list of the facilities 30 where the products that cannot be received in the facility A can be received, based on information received from the system of each of the stores, and transmits the list to the terminal of the consumer. The consumer studies the list displayed on his/her terminal, and decides the facility B different from the facility A as the facility 30 to receive the products being out of stock in. Then, the consumer performs setting in such a way as to receive the products except for the products being out of stock in the facility A, also performs setting in such a way as to receive the products being out of stock in the facility B, and completes an order procedure. Further, the information processing apparatus 10 may compute, for each facility, a time at which all of the products including the products being out of stock can be received, and include the time in the list described above. For example, the information processing apparatus 10 acquires an estimated time at which the product desired by the consumer arrives each facility 30 by using a learning model configured to estimate a time at which a product arrives each facility 30, based on information about manufacturing, delivery, and the like of each product. Then, the information processing apparatus 10 can include, in the list, the estimated time for each facility as the "time at which all of the products can be received". Further, when the consumer needs to make a stop at a plurality of facilities 30 in order to receive all of the products, the information processing apparatus 10 may compute a necessary traveling time by using a distance between the facilities 30, and include, in the list, a time acquired by considering (for example, acquired by adding) the traveling time as the "time at which all of the products can be received". The consumer can appropriately select the facility 30 to receive the products being out of stock in by studying such information about the time.

A salesclerk of a store accommodates a product ordered by a consumer as described above in a container as necessary, and then stores the container in the warehouse 20 of the facility 30 provided near the store. When the salesclerk stores the product or the container that accommodates the product in the warehouse 20, the salesclerk inputs, to the information processing apparatus 10, an identification code (recipient identification information) assigned in advance to the consumer who has ordered the product and information about the product to be stored, such as a product identification code and a product name. By this input, the information acquisition unit 110 can acquire the recipient identification information. Further, the information acquisition unit 110 can acquire attribute information, based on the information about the input product. For example, the information acquisition unit 110 can acquire, from a product information storage unit that stores various types of information about a product on sale, attribute information about a product associated with the information (for example: a product identification code) about the input product. The attribute information about the product includes, for example, information indicating a temperature (a temperature zone such as normal temperature, cooling temperature, freezing temperature, and warm temperature) suitable for storage of the product, information about a size of the product, and the like.

The association unit 120 selects a target storage space from among the plurality of storage spaces 22 by using the attribute information acquired by the information acquisition unit 110. For example, it is assumed that an attribute indicated by the acquired attribute information is "freezing temperature". In this case, the association unit 120 selects, from among the plurality of storage spaces 22, a storage space having a function of keeping an internal temperature in a temperature zone of freezing temperature as a target storage space.

Further, when a plurality of products are ordered, the information acquisition unit 110 may acquire attribute information associated with each of the plurality of products. Then, a plurality of different attributes may be indicated by the plurality of pieces of attribute information acquired in such a manner. In this case, the information acquisition unit 120 can select a target storage space for each of the plurality of attributes. For example, it is assumed that attributes indicated by the plurality of pieces of acquired attribute information are "freezing temperature" and "normal temperature". In this case, the association unit 120 selects, from among the plurality of storage spaces 22, each of a first storage space having a function of keeping an internal temperature in a temperature zone of freezing temperature, and a second storage space having a function of keeping an internal temperature in a temperature zone of normal temperature.

When the target storage space is selected, the association unit 120 stores, in a predetermined storage region, storage space identification information about the target storage space and article determination information that determines an article to be stored in the target storage space in association with each other. Herein, when a plurality of attributes are indicated by a plurality of pieces of attribute information, the association unit 120 stores, in the predetermined storage region, storage space identification information about a target storage space selected for each of the plurality of attributes and article determination information in association with each other. For example, as described above, it is assumed that attributes indicated by the plurality of pieces of acquired attribute information are "freezing temperature" and "normal temperature", and the association unit 120 selects the first storage space and the second storage space for the respective attributes. In this case, the association unit 120 stores, in the predetermined storage region, storage space identification information about the first storage space, storage space identification information about the second storage space, and article determination information in association with one another. In this case, any information can be used as the article determination information. For example, the article determination information may be an identifier (ID) assigned in advance to each consumer, or may be a character string being automatically generated in such a way as to be unique according to a predetermined rule.

Then, the information processing apparatus 10 moves the article to the storage space selected by the association unit 120 by controlling the conveyance path 24 and the elevator 26. When the article is correctly disposed in the storage space, a response signal is transmitted to the article determination information transmission unit 130. The article determination information transmission unit 130 recognizes that the article is disposed in the storage space in response to reception of the response signal. Subsequently, the article determination information transmission unit 130 acquires destination address information associated with the recipient identification information being acquired by the information acquisition unit 110, and determines a transmission destination of the article determination information. Then, the article determination information transmission unit 130 transmits the article determination information to a terminal of an associated consumer by using the acquired destination address information.

The consumer recognizes, by acquiring the article determination information, that it has become possible to receive a product purchased by himself/herself. Subsequently, the consumer goes to the facility 30, and inputs, to the information processing apparatus 10, the article determination information transmitted to the terminal. For example, the consumer performs short-range wireless communication between his/her terminal and the information processing apparatus 10, and inputs the article determination information to the information processing apparatus 10. Further, for example, the consumer may input the article determination information to the information processing apparatus 10 by displaying a one-dimensional or two-dimensional code symbol in which the article determination information is encoded on a display of his/her terminal, and causing a reading apparatus (not illustrated) included in the information processing apparatus 10 to read the code symbol. Further, for example, the consumer may input the article determination information by using a keyboard and a touch panel (not illustrated) included in the information processing apparatus 10.

When the article determination information is input, the article ejection unit 140 refers to the predetermined storage region, and reads the storage space identification information associated with the input article determination information. Then, the article ejection unit 140 determines the storage space in which the article being a target is stored, based on the read storage space identification information.

Herein, when a plurality of the pieces of storage space identification information are associated with the article determination information, the article ejection unit 140 can determine a plurality of storage spaces, based on the plurality of pieces of storage space identification information. Then, the article ejection unit 140 takes out the article from the determined storage space by controlling the conveyance path 24, the elevator 26, and the like, and ejects the article from a predetermined outlet.

In this way, a consumer can purchase a product without facing a salesclerk. Further, an ordered product is stored in a storage space suitable for an attribute associated with the product. In such a manner, a product can be prevented from being damaged by a surrounding environment during storage. In this way, sale of a product using the article management system 1 can be smoothly performed.

<Second Use Case: Collection and Delivery of Package>

The article management system 1 can also be used as a system for collecting and delivering a package. In this use case, a recipient is a delivery company that performs work for collecting and delivering an article stored in the warehouse 20, or a person who eventually receives an article stored in the warehouse 20.

Figure 7:
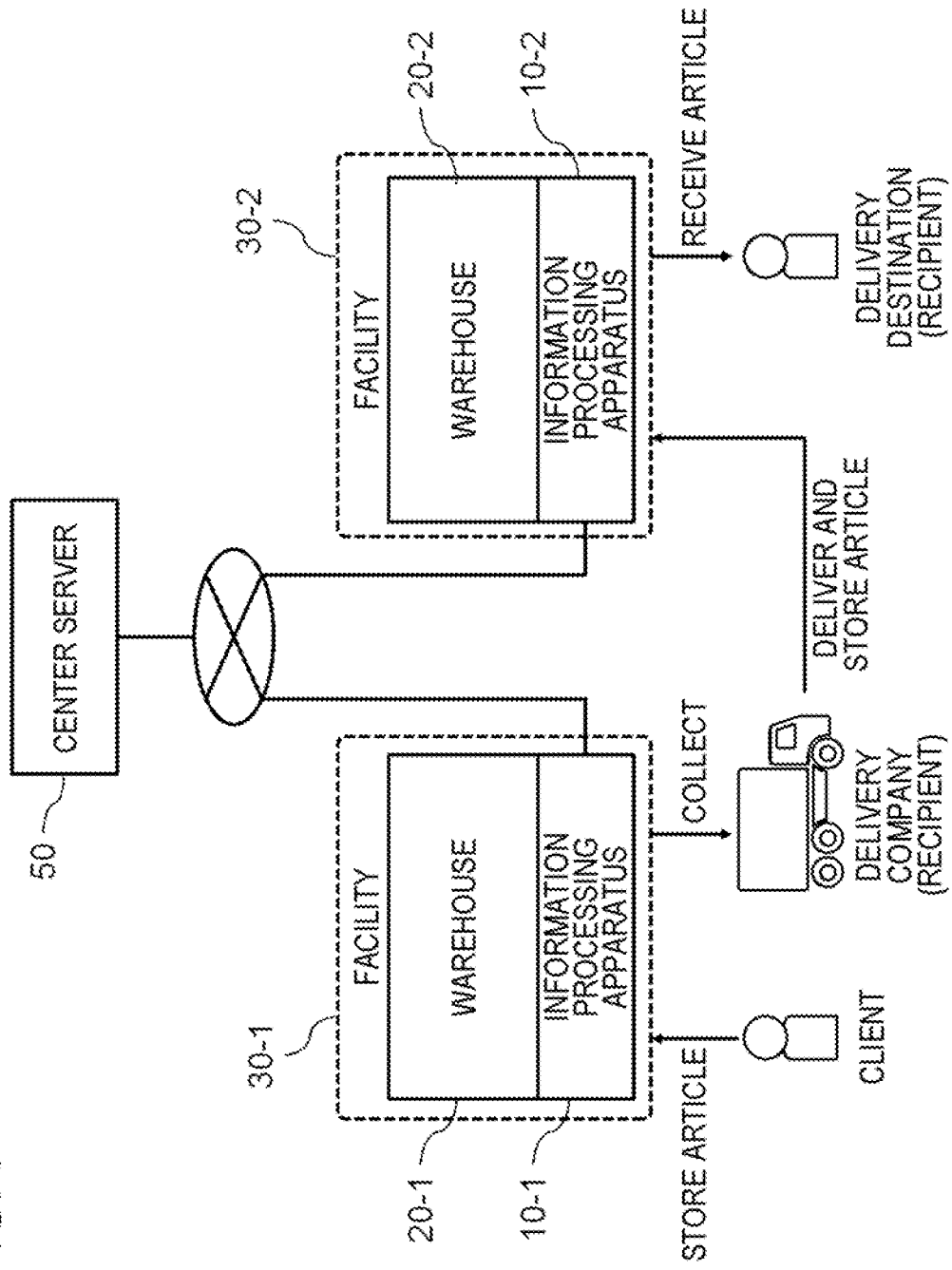
FIG. 7 is a diagram illustrating a system configuration in a second use case.

FIG. 7 is a diagram illustrating a system configuration in a second use case. In FIG. 7, a reference sign 30-1 indicates a facility (hereinafter, also expressed as a "first facility 30-1") where a client who requests a delivery company to deliver an article visits in order to leave the article therewith. Further, a reference sign 30-2 indicates a facility (hereinafter, also expressed as a "second facility 30-2") where a person who eventually receives the article delivered by the delivery company visits. A reference sign 50 indicates a center server. The center server 50 stores information shared among a plurality of the information processing apparatuses 10 each located at a different place.

First, a client who requests a delivery company to deliver an article goes to store the article in a first warehouse 20-1 provided in the first facility 30-1. Herein, the client inputs, to a first information processing apparatus 10-1, identification information about the delivery company (recipient at a time of collection of the article) and attribute information indicating an attribute that needs to be satisfied during storage of the article. The information acquisition unit 110 acquires the identification information (recipient identification information) about the delivery company and the attribute information, based on the input. Further, the first information processing apparatus 10-1 may further have a function of measuring a size and a weight of the article, and requesting, from the client, payment of a charge according to a measurement result of the size and the weight. In this case, the information acquisition unit 110 may acquire a measurement result of the size and the weight of the article as the attribute information. Further, the first information processing apparatus 10-1 may further acquire information (for example, an e-mail address of a terminal possessed by a person of the delivery destination, and the like) indicating the delivery destination of the article to be stored in the first warehouse 20-1, and transmit the information together with the attribute information about the article to the center server 50. The information transmitted to the center server 50 herein is used when the delivery company stores the article in the second facility 30-2. In this case, the first information processing apparatus 10-1 is configured to attach, to a surface of the article, a code symbol including information (search information) for reading information stored in the center server 50 for the article, and the like.

The association unit 120 selects a storage space suitable for an attribute indicated by the attribute information from among the plurality of storage spaces 22, based on the attribute information acquired by the information acquisition unit 110. For example, it is assumed that an attribute indicated by the attribute information input from the client is "cooling temperature". In this case, the association unit 120 selects, from among the plurality of storage spaces 22, a storage space having a function of keeping an internal temperature in a temperature zone of cooling temperature as a target storage space. Further, when a measurement result of a size and a weight of the article is included in the attribute information, the association unit 120 can select a storage space suitable for the measurement result as a target storage space.

When the target storage space is selected, the association unit 120 stores, in a predetermined storage region, storage space identification information about the target storage space and article determination information that determines the article to be stored in the target storage space in association with each other. In this case, the article determination information is any information (for example, an identification code assigned for each delivery company) that can identify a delivery company.

Then, the first information processing apparatus 10-1 moves the article to the storage space selected by the association unit 120 by controlling the conveyance path 24 and the elevator 26. When the article is correctly disposed in the storage space, a response signal is transmitted to the article determination information transmission unit 130. The article determination information transmission unit 130 recognizes that the article is disposed in the storage space in response to reception of the response signal. Subsequently, the article determination information transmission unit 130 acquires destination address information about the delivery company being associated with the identification information about the delivery company being acquired by the information acquisition unit 110. In this way, a transmission destination of the article determination information is determined. Then, the article determination information transmission unit 130 transmits, by using the acquired destination address information, the article determination information and information (for example, an address, an identification code, and the like of the first facility 30-1) indicating a collection position to a terminal of the delivery company.

The delivery company that receives the article determination information goes to the first facility 30-1 according to the information about the collection position, and goes to receive the article stored in the warehouse 20-1. The delivery company inputs, to the first information processing apparatus 10-1, the article determination information (identification information about the delivery company) transmitted to the terminal. For example, the delivery company performs short-range wireless communication between the terminal of the delivery company and the first information processing apparatus 10-1, and inputs the article determination information to the information processing apparatus 10-1. Further, for example, the delivery company may display a one-dimensional or two-dimensional code symbol in which the article determination information is encoded on a display of the terminal of the delivery company, and may cause the code symbol to be read via a reading apparatus (not illustrated) included in the first information processing apparatus 10-1. Further, for example, the delivery company may input the article determination information by using a keyboard and a touch panel (not illustrated) included in the first information processing apparatus 10-1.

When the article determination information is input, the article ejection unit 140 refers to the predetermined storage region, and reads storage space identification information associated with the input article determination information. In this case, all pieces of the storage space identification information being associated with the identification information about the delivery company are read. Then, the article ejection unit 140 determines a storage space in which the article being a target is stored, based on the read storage space identification information. Herein, when a plurality of the pieces of storage space identification information are associated with the article determination information, the article ejection unit 140 can determine a plurality of storage spaces, based on the plurality of pieces of storage space identification information. Then, the article ejection unit 140 takes out the article from the determined storage space by controlling the conveyance path 24, the elevator 26, and the like, and ejects the article from a predetermined outlet.

When the delivery company receives the ejected article, the delivery company performs delivery according to the request from the client. Herein, the delivery company may go to store the article in the second facility 30-2 located near the place of the delivery destination of the article.

In this case, the delivery company stores the article collected from the first facility 30-1 into a warehouse 20-2 of the second facility 30-2 by using a second information processing apparatus 10-2 of the second facility 30-2. At this time, the second information processing apparatus 10-2 reads the code symbol attached to the surface of the article by the first information processing apparatus 10-1, and acquires the search information included in the code symbol. The information acquisition unit 110 acquires information (information indicating a delivery destination of the article and the attribute information) stored in the center server 50 by using the search information. Herein, the "information indicating the delivery destination of the article" is, for example, an e-mail address of a terminal possessed by a person of the delivery destination, and corresponds to the recipient identification information.

The association unit 120 selects, from among the plurality of storage spaces 22, a storage space suitable for an attribute indicated by the attribute information being acquired from the center server 50, based on the attribute information. The flow of the processing herein is similar to the flow described in the first information processing apparatus 10-1.

When the target storage space is selected, the association unit 120 stores, in a predetermined storage region, storage space identification information about the target storage space and article determination information that determines the article to be stored in the target storage space in association with each other. The article determination information associated herein is any information being uniquely determined.

Then, the second information processing apparatus 10-2 moves the article to the storage space selected by the association unit 120 by controlling the conveyance path 24 and the elevator 26. When the article is correctly disposed in the storage space, a response signal is transmitted to the article determination information transmission unit 130. The article determination information transmission unit 130 recognizes that the article is disposed in the storage space in response to reception of the response signal. Subsequently, the article determination information transmission unit 130 transmits, by using address information about a terminal possessed by a person of the delivery destination being acquired by the information acquisition unit 110, the article determination information to the terminal.

The person of the delivery destination recognizes, by acquiring the article determination information, that a package for himself/herself is stored in the warehouse 20-2 of the second facility 30-2. The person of the delivery destination goes to the second facility 30-2, and inputs, to the second information processing apparatus 10-2, the article determination information transmitted to the terminal. For example, the person of the delivery destination performs short-range wireless communication between his/her terminal and the second information processing apparatus 10-2, and inputs the article determination information to the second information processing apparatus 10-2. Further, for example, the person of the delivery destination may display a one-dimensional or two-dimensional code symbol in which the article determination information is encoded on a display of his/her terminal, and may cause the code symbol to be read via a reading apparatus (not illustrated) included in the second information processing apparatus 10-2. Further, for example, the person of the delivery destination may input the article determination information by using a keyboard and a touch panel (not illustrated) included in the second information processing apparatus 10-2.

When the article determination information is input, the article ejection unit 140 refers to the predetermined storage region, and reads the storage space identification information associated with the input article determination information. Then, the article ejection unit 140 determines the storage space in which the article being a target is stored, based on the read storage space identification information. Herein, when a plurality of the pieces of storage space identification information are associated with the article determination information, the article ejection unit 140 can determine a plurality of storage spaces, based on the plurality of pieces of storage space identification information. Then, the article ejection unit 140 takes out the article from the determined storage space by controlling the conveyance path 24, the elevator 26, and the like, and ejects the article from a predetermined outlet.

In this way, a client can request delivery of an article without facing a delivery company. Further, a delivery company can deliver an article without facing a person of a delivery destination of an entrusted article. Further, an article to be delivered is stored in a storage space suitable for an attribute associated with the article. In such a manner, an article can be prevented from being damaged by a surrounding environment during storage. In this way, delivery work using the article management system 1 can be smoothly performed.

<Third Use Case: Unattended Sale>

The article management system 1 can also be used as an unattended sales system. For example, a product associated with each storage space 22 in the warehouse 20 may be stored in advance, and the article management system 1 may be used in such a way that a product is ejected from the storage space in response to an order received in the information processing apparatus 10. In this case, a recipient is a general consumer who purchases a product by using the system.

Figure 8:
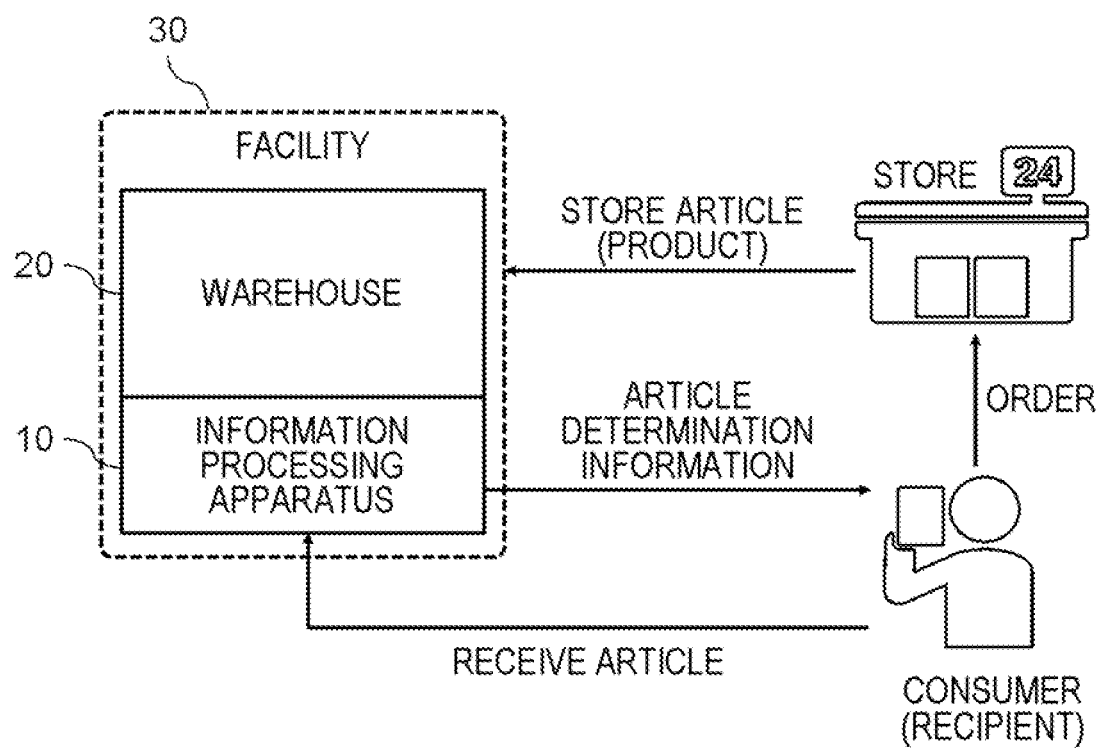
FIG. 8 is a diagram illustrating a system configuration example in a third use case.

FIG. 8 is a diagram illustrating a system configuration example in a third use case. In the present use case, a product to be sold is stored in advance in each storage space 22 of the warehouse 20.

In the present use case, the information processing apparatus 10 further has a function of receiving an order for a product. The information processing apparatus 10 receives an order for a product via an input apparatus (such as a keyboard and a touch panel) included in the information processing apparatus 10, for example. In other words, the information processing apparatus 10 is configured to acquire information (product identification information) for identifying a product purchased by a consumer via the input apparatus. Further, the information processing apparatus 10 may be configured to receive an order (product identification information) for a product from a terminal of a consumer via a network. Further, the information processing apparatus 10 may further include a means (not illustrated) for contact with a call center in order to deal with trouble during ordering such as a case where an operation method is not clear.

When the information processing apparatus 10 receives an order for a product, the information processing apparatus 10 performs preparation for the ejection of the product. Herein, when there is no product being out of stock among ordered products of a consumer, the information processing apparatus 10 takes out each product from a storage space associated with the product, and ejects the ordered product from a predetermined outlet. On the other hand, when there is a product being out of stock among ordered products, the information processing apparatus 10 transmits a request for the replenishment of the product to a salesclerk terminal which is a terminal of a store that manages a sales product. A salesclerk goes to the facility 30 in response to the replenishment request of the product, and replenishes the product being out of stock in the storage space 22 associated with the product. When the salesclerk disposes the product being out of stock in the associated storage space 22, a signal indicating that the product associated with the disposed space is replenished is transmitted to the information processing apparatus 10. The information processing apparatus 10 can recognize that the product being out of stock is replenished in response to reception of the signal. Then, the information processing apparatus 10 takes out the product from the storage space associated with each product, and ejects the ordered product from the predetermined outlet. Note that, the information processing apparatus 10 may further include a mechanism for automatically packing a product taken out from each storage space into a predetermined container (for example, a corrugated box, a shopping bag, or the like).

With the system, a salesclerk does not need to be on a spot when a product is sold, unlike a conventional store. Thus, a customer can purchase a product at any time. Further, with the system, a salesclerk may only perform replenishment work of a product regularly or as necessary, and an effect of greatly reducing man hours required for store work is expected. Further, since a salesclerk and a consumer do not need to face each other when a product is purchased, a desirable effect in terms of hygiene can also be expected.

While the example embodiments of the present invention have been described above with reference to the drawings, the present invention should not be interpreted by being limited to the example embodiments. A plurality of components disclosed in the example embodiments can form various inventions by an appropriate combination. Further, for the example embodiments described herein, various modifications, improvements, and the like can be made based on knowledge of a person skilled in the art without departing from the scope of the present invention. For example, a functional configuration unit disclosed in the example embodiments described above may be included in one apparatus, or may be distributed and included in a plurality of apparatuses. Further, for example, the example described above exemplifies one article being stored in one storage space 22, but, when one storage space 22 has a sufficient size, a plurality of articles may be stored in one storage space 22. In this case, the article ejection unit 140 is configured to decide, by using article determination information, an article that needs to be taken out from among a plurality of articles stored in one storage space 22. For example, pieces of appearance information indicating appearance features (a representative color, a shape, a size, a design or a character string present on a surface, and the like) of articles stored in the storage space 22 are stored in advance in association with pieces of article determination information, and thus the article ejection unit 140 can determine an article that coincides with a feature indicated by appearance information associated with article determination information. Note that, "coincidence" herein includes a case of a degree of similarity equal to or more than a certain level. Then, the article ejection unit 140 controls a mechanism for article ejection in the warehouse 20 in such a way as to eject only an intended article.

Further, the plurality of steps (processing) are described in order in the flowcharts used in the above-described description, but an execution order of steps performed in each of the example embodiments is not limited to the described order. In each of the example embodiments, an order of illustrated steps may be changed within an extent that there is no harm in context. Further, each of the example embodiments described above can be combined within an extent that a content is not inconsistent.

A part or the whole of the above-described example embodiment may also be described in supplementary notes below, which is not limited thereto.

1. An information processing apparatus including:
    an information acquisition unit that acquires recipient identification information that identifies a recipient of an article stored in a warehouse including a plurality of storage spaces, and attribute information indicating an attribute that needs to be satisfied during storage of the article;
    an association unit that selects, as a target storage space, a storage space having the attribute indicated by the attribute information from among the plurality of storage spaces, and stores, in a storage region, storage space identification information that identifies the target storage space and article determination information that determines the article in association with each other;
    an article determination information transmission unit that determines a terminal used by the recipient by using the recipient identification information, in response to the article being disposed in the target storage space, and transmits the article determination information to the terminal; and
    an article ejection unit that ejects, from a predetermined outlet, the article stored in the target storage space identified by the storage space identification information being associated with the article determination information, in response to an input of the article determination information.

2. The information processing apparatus according to supplementary note 1, in which
    the attribute information includes information indicating a temperature suitable for storage of the article.

3. The information processing apparatus according to supplementary note 2, in which
    the information indicating a temperature suitable for storage of the article is information indicating a temperature zone of any of freezing temperature, cooling temperature, normal temperature, and warm temperature.

4. The information processing apparatus according to any one of supplementary notes 1 to 3, in which
the information acquisition unit
acquires product identification information about a product to be purchased by the recipient, and
acquires attribute information associated with the product identification information from a product information storage unit that stores various types of information about a product on sale.
5. The information processing apparatus according to supplementary note 4, in which
the information acquisition unit acquires, when a plurality of pieces of the product identification information are acquired, the attribute information associated with each of the plurality of pieces of product identification information from the product information storage unit, and
the association unit
selects, when a plurality of attributes are indicated by a plurality of pieces of the attribute information acquired from the product information storage unit, the target storage space for each of the plurality of attributes, and
stores, in the storage region, the article determination information and the storage space identification information about the target storage space selected for each attribute in association with each other.
6. The information processing apparatus according to supplementary note 4 or 5, in which
the information acquisition unit acquires the product identification information from the terminal.
7. The information processing apparatus according to any one of supplementary notes 1 to 6, in which
the article ejection unit decides, by further using the article determination information, an article that needs to be taken out from among articles stored in the target storage space.
8. The information processing apparatus according to supplementary note 7, in which
the article ejection unit determines, by using appearance information that is stored in association with the article determination information and indicates an appearance feature of the article, an article having an appearance feature that coincides with the appearance feature indicated by the appearance information from among articles stored in the target storage space, and decides the determined article as the article that needs to be taken out.
9. An article management system including:
a warehouse including a plurality of storage spaces;
an information acquisition unit that acquires recipient identification information that identifies a recipient of an article stored in the warehouse, and attribute information indicating an attribute that needs to be satisfied during storage of the article;
an association unit that selects, as a target storage space, a storage space having the attribute indicated by the attribute information from among the plurality of storage spaces, and stores, in a storage region, storage space identification information that identifies the target storage space and article determination information that determines the article in association with each other;
an article determination information transmission unit that determines a terminal used by the recipient by using the recipient identification information, in response to the article being disposed in the target storage space, and transmits the article determination information to the terminal; and
an article ejection unit that ejects, from a predetermined outlet, the article stored in the target storage space identified by the storage space identification information being associated with the article determination information, in response to an input of the article determination information.
10. The article management system according to supplementary note 9, in which
the attribute information includes information indicating a temperature suitable for storage of the article.
11. The article management system according to supplementary note 10, in which
the information indicating a temperature suitable for storage of the article is information indicating a temperature zone of any of freezing temperature, cooling temperature, normal temperature, and warm temperature.
12. The article management system according to any one of supplementary notes 9 to 11, in which
the information acquisition unit
acquires product identification information about a product to be purchased by the recipient, and
acquires attribute information associated with the product identification information from a product information storage unit that stores various types of information about a product on sale.
13. The article management system according to supplementary note 12, in which
the information acquisition unit acquires, when a plurality of pieces of the product identification information are acquired the attribute information associated with each of the plurality of pieces of product identification information from the product information storage unit, and
the association unit
selects, when a plurality of attributes are indicated by a plurality of pieces of the attribute information acquired from the product information storage unit, the target storage space for each of the plurality of attributes, and
stores, in the storage region, the article determination information and the storage space identification information about the target storage space selected for each attribute in association with each other.
14. The article management system according to supplementary note 12 or 13, in which
the information acquisition unit acquires the product identification information from the terminal.
15. The article management system according to any one of supplementary notes 9 to 14, in which
the article ejection unit decides, by further using the article determination information, an article that needs to be taken out from among articles stored in the target storage space.
16. The article management system according to supplementary note 15, in which
the article ejection unit determines, by using appearance information that is stored in association with the article determination information and indicates an appearance feature of the article, an article having an appearance feature that coincides with the appearance feature indicated by the appearance information from among articles stored in the target storage space, and decides the determined article as the article that needs to be taken out.

17. An article management method including,
   by a computer:
   acquiring recipient identification information that identifies a recipient of an article stored in a warehouse including a plurality of storage spaces, and attribute information indicating an attribute that needs to be satisfied during storage of the article;
   selecting, as a target storage space, a storage space having the attribute indicated by the attribute information from among the plurality of storage spaces;
   storing, in a storage region, storage space identification information that identifies the target storage space and article determination information that determines the article in association with each other;
   determining a terminal used by the recipient by using the recipient identification information, in response to the article being disposed in the target storage space;
   transmitting the article determination information to the terminal; and
   ejecting, from a predetermined outlet, the article stored in the target storage space identified by the storage space identification information being associated with the article determination information, in response to an input of the article determination information.
18. The article management method according to supplementary note 17, in which
   the attribute information includes information indicating a temperature suitable for storage of the article.
19. The article management method according to supplementary note 18, in which
   the information indicating a temperature suitable for storage of the article is information indicating a temperature zone of any of freezing temperature, cooling temperature, normal temperature, and warm temperature.
20. The article management method according to any one of supplementary notes 17 to 19, further including,
   by the computer:
   acquiring product identification information about a product to be purchased by the recipient; and
   acquiring attribute information associated with the product identification information from a product information storage unit that stores various types of information about a product on sale.
21. The article management method according to supplementary note 20, further including,
   by the computer:
   acquiring, when a plurality of pieces of the product identification information are acquired, the attribute information associated with each of the plurality of pieces of product identification information from the product information storage unit;
   selecting, when a plurality of attributes are indicated by a plurality of pieces of the attribute information acquired from the product information storage unit, the target storage space for each of the plurality of attributes; and
   storing, in the storage region, the article determination information and the storage space identification information about the target storage space selected for each attribute in association with each other.
22. The article management method according to supplementary note 20 or 21, further including,
   by the computer,
   acquiring the product identification information from the terminal.
23. The article management method according to any one of supplementary notes 17 to 22, further including,
   by the computer,
   deciding, by further using the article determination information, an article that needs to be taken out from among articles stored in the target storage space.
24. The article management method according to supplementary note 23, further including,
   by the computer,
   determining, by using appearance information that is stored in association with the article determination information and indicates an appearance feature of the article, an article having an appearance feature that coincides with the appearance feature indicated by the appearance information from among articles stored in the target storage space, and deciding the determined article as the article that needs to be taken out.
25. A program causing a computer to function as:
   an information acquisition unit that acquires recipient identification information that identifies a recipient of an article stored in a warehouse including a plurality of storage spaces, and attribute information indicating an attribute that needs to be satisfied during storage of the article;
   an association unit that selects, as a target storage space, a storage space having the attribute indicated by the attribute information from among the plurality of storage spaces, and stores, in a storage region, storage space identification information that identifies the target storage space and article determination information that determines the article in association with each other;
   an article determination information transmission unit that determines a terminal used by the recipient by using the recipient identification information, in response to the article being disposed in the target storage space, and transmits the article determination information to the terminal; and
   an article ejection unit that ejects, from a predetermined outlet, the article stored in the target storage space identified by the storage space identification information being associated with the article determination information, in response to an input of the article determination information.
26. The program according to supplementary note 25, in which
   the attribute information includes information indicating a temperature suitable for storage of the article.
27. The program according to supplementary note 26, in which
   the information indicating a temperature suitable for storage of the article is information indicating a temperature zone of any of freezing temperature, cooling temperature, normal temperature, and warm temperature.
28. The program according to any one of supplementary notes 25 to 27, in which
   the information acquisition unit
   acquires product identification information about a product to be purchased by the recipient, and
   acquires attribute information associated with the product identification information from a product information storage unit that stores various types of information about a product on sale.

29. The program according to supplementary note 28, in which
the information acquisition unit acquires, when a plurality of pieces of the product identification information are acquired, the attribute information associated with each of the plurality of pieces of product identification information from the product information storage unit, and
the association unit
selects, when a plurality of attributes are indicated by a plurality of pieces of the attribute information acquired from the product information storage unit, the target storage space for each of the plurality of attributes, and
stores, in the storage region, the article determination information and the storage space identification information about the target storage space selected for each attribute in association with each other.

30. The program according to supplementary note 28 or 29, in which
the information acquisition unit acquires the product identification information from the terminal.

31. The program according to any one of supplementary notes 25 to 30, in which
the article ejection unit decides, by further using the article determination information, an article that needs to be taken out from among articles stored in the target storage space.

32. The program according to supplementary note 31, in which
the article ejection unit determines, by using appearance information that is stored in association with the article determination information and indicates an appearance feature of the article, an article having an appearance feature that coincides with the appearance feature indicated by the appearance information from among articles stored in the target storage space, and decides the determined article as the article that needs to be taken out.

This application is based upon and claims the benefit of priority from Japanese patent application No. 2021-024952, filed on Feb. 19, 2021, the disclosure of which is incorporated herein in its entirety by reference.

REFERENCE SIGNS LIST

1 Article management system
10 Information processing apparatus
1010 Bus
1020 Processor
1030 Memory
1040 Storage device
1050 Input/output interface
1060 Network interface
110 Information acquisition unit
120 Association unit
130 Article determination information transmission unit
140 Article ejection unit
20 Warehouse
22 Storage space
24 Conveyance path
26 Elevator
30 Facility
40 Article
50 Center server

What is claimed is:

1. An information processing apparatus comprising:
at least one memory configured to store instructions; and
at least one processor configured to execute the instructions to perform operations; the operations comprising:
acquiring recipient identification information that identifies a recipient of an article stored in a warehouse including a plurality of storage spaces, and attribute information indicating an attribute that needs to be satisfied during storage of the article;
selecting, as a target storage space, a storage space having the attribute indicated by the attribute information from among the plurality of storage spaces;
storing, in a storage region, storage space identification information that identifies the target storage space and article determination information that determines the article in association with each other;
determining a terminal used by the recipient by using the recipient identification information, in response to the article being disposed in the target storage space,
transmitting the article determination information to the terminal; and
ejecting, from a predetermined outlet, the article stored in the target storage space identified by the storage space identification information being associated with the article determination information, in response to an input of the article determination information.

2. The information processing apparatus according to claim 1, wherein
the attribute information includes information indicating a temperature suitable for storage of the article.

3. The information processing apparatus according to claim 2, wherein
the information indicating a temperature suitable for storage of the article is information indicating a temperature zone of any of freezing temperature, cooling temperature, normal temperature, and warm temperature.

4. The information processing apparatus according to claim 1, wherein
the operations further comprise
acquiring product identification information about a product to be purchased by the recipient, and
acquiring attribute information associated with the product identification information from a product information storage that stores various types of information about a product on sale.

5. The information processing apparatus according to claim 4, wherein the operations further comprise
acquiring, when a plurality of pieces of the product identification information are acquired, the attribute information associated with each of the plurality of pieces of product identification information from the product information storage, and
selecting, when a plurality of attributes are indicated by a plurality of pieces of the attribute information acquired from the product information storage, the target storage space for each of the plurality of attributes, and
storing, in the storage region, the article determination information and the storage space identification information about the target storage space selected for each attribute in association with each other.

6. The information processing apparatus according to claim 4, wherein
the operations further comprise acquiring the product identification information from the terminal.

7. The information processing apparatus according to claim 1, wherein
the operations further comprise deciding, by further using the article determination information, an article that needs to be taken out from among articles stored in the target storage space.

8. The information processing apparatus according to claim 7, wherein the operations further comprise
determining, by using appearance information that is stored in association with the article determination information and indicates an appearance feature of the article, an article having an appearance feature that coincides with the appearance feature indicated by the appearance information from among articles stored in the target storage space, and deciding the determined article as the article that needs to be taken out.

9. An article management system comprising:
a warehouse including a plurality of storage spaces;
at least one memory configured to store instructions; and
at least one processor configured to execute the instructions to perform operations; the operations comprising:
acquiring recipient identification information that identifies a recipient of an article stored in the warehouse, and attribute information indicating an attribute that needs to be satisfied during storage of the article;
selecting, as a target storage space, a storage space having the attribute indicated by the attribute information from among the plurality of storage spaces;
storing, in a storage region, storage space identification information that identifies the target storage space and article determination information that determines the article in association with each other;
determining a terminal used by the recipient by using the recipient identification information, in response to the article being disposed in the target storage space;
transmitting the article determination information to the terminal; and
ejecting, from a predetermined outlet, the article stored in the target storage space identified by the storage space identification information being associated with the article determination information, in response to an input of the article determination information.

10. The article management system according to claim 9, wherein
the attribute information includes information indicating a temperature suitable for storage of the article.

11. The article management system according to claim 10, wherein
the information indicating a temperature suitable for storage of the article is information indicating a temperature zone of any of freezing temperature, cooling temperature, normal temperature, and warm temperature.

12. The article management system according to claim 9, wherein
the operations further comprise
acquiring product identification information about a product to be purchased by the recipient, and
acquiring attribute information associated with the product identification information from a product information storage that stores various types of information about a product on sale.

13. The article management system according to claim 12, wherein the operations further comprise
acquiring, when a plurality of pieces of the product identification information are acquired, the attribute information associated with each of the plurality of pieces of product identification information from the product information storage, and
selecting, when a plurality of attributes are indicated by a plurality of pieces of the attribute information acquired from the product information storage, the target storage space for each of the plurality of attributes, and
storing in the storage region, the article determination information and the storage space identification information about the target storage space selected for each attribute in association with each other.

14. The article management system according to claim 12, wherein
the operations further comprise acquiring the product identification information from the terminal.

15. An article management method comprising,
by a computer:
acquiring recipient identification information that identifies a recipient of an article stored in a warehouse including a plurality of storage spaces, and attribute information indicating an attribute that needs to be satisfied during storage of the article;
selecting, as a target storage space, a storage space having the attribute indicated by the attribute information from among the plurality of storage spaces;
storing, in a storage region, storage space identification information that identifies the target storage space and article determination information that determines the article in association with each other;
determining a terminal used by the recipient by using the recipient identification information, in response to the article being disposed in the target storage space;
transmitting the article determination information to the terminal; and
ejecting, from a predetermined outlet, the article stored in the target storage space identified by the storage space identification information being associated with the article determination information, in response to an input of the article determination information.

16. The article management method according to claim 15, wherein
the attribute information includes information indicating a temperature suitable for storage of the article.

17. The article management method according to claim 16, wherein
the information indicating a temperature suitable for storage of the article is information indicating a temperature zone of any of freezing temperature, cooling temperature, normal temperature, and warm temperature.

18. The article management method according to claim 15, further comprising,
by the computer:
acquiring product identification information about a product to be purchased by the recipient; and
acquiring attribute information associated with the product identification information from a product information storage that stores various types of information about a product on sale.

19. The article management method according to claim 18, further comprising,
by the computer:
acquiring, when a plurality of pieces of the product identification information are acquired, the attribute information associated with each of the plurality of pieces of product identification information from the product information storage;

selecting, when a plurality of attributes are indicated by a plurality of pieces of the attribute information acquired from the product information storage, the target storage space for each of the plurality of attributes; and storing, in the storage region, the article determination information and the storage space identification information about the target storage space selected for each attribute in association with each other.

20. The article management method according to claim 18, further comprising, by the computer, acquiring the product identification information from the terminal.

\* \* \* \* \*